(12) United States Patent
Liu et al.

US009948669B2

(10) Patent No.: US 9,948,669 B2
(45) Date of Patent: Apr. 17, 2018

(54) METHOD AND SYSTEM FOR APPLICATION MIGRATION DUE TO DEGRADED QUALITY OF SERVICE

(71) Applicant: Accenture Global Services Limited, Dublin (IE)

(72) Inventors: Huan Liu, Sunnyvale, CA (US); Dan Orban, Sunnyvale, CA (US)

(73) Assignee: Accenture Global Services Limited, Dublin (IE)

( * ) Notice: Subject to any disclaimer, the term of this patent is extended or adjusted under 35 U.S.C. 154(b) by 913 days.

(21) Appl. No.: 14/272,102

(22) Filed: May 7, 2014

(65) Prior Publication Data

US 2014/0359767 A1   Dec. 4, 2014

Related U.S. Application Data

(63) Continuation of application No. 12/435,596, filed on May 5, 2009, now Pat. No. 8,751,627.

(51) Int. Cl.

| | |
|---|---|
| G06F 15/16 | (2006.01) |
| H04L 29/06 | (2006.01) |
| G06F 9/50 | (2006.01) |
| H04L 29/08 | (2006.01) |
| G06F 11/20 | (2006.01) |

(52) U.S. Cl.
CPC ........ *H04L 63/1441* (2013.01); *G06F 9/5088* (2013.01); *H04L 29/06523* (2013.01); *H04L 63/1408* (2013.01); *H04L 63/1458* (2013.01); *H04L 65/80* (2013.01); *H04L 67/10* (2013.01); *G06F 11/203* (2013.01)

(58) Field of Classification Search
CPC ........................ H04L 63/1408; H04L 63/1458

USPC ......................................................... 709/217
See application file for complete search history.

(56) References Cited

U.S. PATENT DOCUMENTS

| | | |
|---|---|---|
| 6,430,160 B1 | 8/2002 | Smith et al. |
| 6,725,378 B1 | 4/2004 | Schuba et al. |
| 6,775,704 B1 | 8/2004 | Watson et al. |
| 6,871,071 B2 | 3/2005 | Takao et al. |
| 7,058,974 B1 | 6/2006 | Maher et al. |

(Continued)

FOREIGN PATENT DOCUMENTS

| | | |
|---|---|---|
| EP | 1231756 | 8/2002 |
| WO | 2009/012132 | 1/2009 |

OTHER PUBLICATIONS

"A Brief History of Cloud Computing: Is the Cloud There Yet?," Paul Wallis's Blog, 2008, 6 pages.

(Continued)

*Primary Examiner* — Karen Tang
(74) *Attorney, Agent, or Firm* — Fish & Richardson P.C.

(57) ABSTRACT

A method and system for managing an application in a cloud data center by monitoring the bandwidth of a subnet of which the primary operating instance of an application is a member. If a severe deterioration in the bandwidth caused by an over consumption of the subnet resources from other subnet constituents is detected, a suitable secondary instance in an alternate, uncompromised subnet is located and primary operation of the application is transferred from the former primary operating instance to the secondary instance. The secondary instance can be pre-launched or dynamically requisitioned according to various embodiments.

27 Claims, 10 Drawing Sheets

(56) References Cited

U.S. PATENT DOCUMENTS

| | | | |
|---|---|---|---|
| 435,596 | A1 | 5/2009 | Vaughn |
| 7,633,940 | B1* | 12/2009 | Singh ................. H04L 45/12 370/237 |
| 7,694,338 | B1 | 4/2010 | Jafari et al. |
| 7,757,059 | B1* | 7/2010 | Ofer ................. G06F 3/0626 711/165 |
| 2003/0016630 | A1 | 1/2003 | Vega-Garcia et al. |
| 2004/0128539 | A1 | 7/2004 | Shuteih |
| 2006/0010389 | A1 | 1/2006 | Rooney et al. |
| 2007/0008883 | A1 | 1/2007 | Kobayashi |
| 2007/0086485 | A1 | 4/2007 | Vega-Garcia et al. |
| 2007/0180436 | A1* | 8/2007 | Travostino ........... G06F 9/4856 717/138 |
| 2008/0028463 | A1 | 1/2008 | Dagon et al. |
| 2008/0077638 | A1 | 3/2008 | Monk et al. |
| 2008/0082480 | A1 | 4/2008 | Gounares et al. |
| 2008/0082670 | A1 | 4/2008 | Gounares et al. |
| 2008/0083031 | A1 | 4/2008 | Meijer et al. |
| 2008/0083040 | A1 | 4/2008 | Dani et al. |
| 2008/0168559 | A1* | 7/2008 | Touitou ............... H04L 63/0236 726/23 |
| 2009/0055507 | A1* | 2/2009 | Oeda .................... G06F 9/4856 709/216 |
| 2009/0228589 | A1 | 9/2009 | Korupolu |
| 2009/0276771 | A1 | 11/2009 | Nickolov et al. |
| 2010/0238835 | A1* | 9/2010 | Lundgren ........... H04L 12/2697 370/253 |

OTHER PUBLICATIONS

"Why Cloud Computing Needs Security," Alistair Coll, Jun. 2008, 2 pages.
Danielson, ebiz, The Insider's Guide to Business and IT Agility, "Distinguishing Cloud Computing from Utility Computing," Mar. 2008, 2 pages.
Faler, Willie Faler's Buzzwork Bingo, Random Ramblings on Software Development, Entrepreneurship, Technology & Economics, "Auto-Scaling Cloud Computing and Denial of Service Attacks" Dec. 2008, 2 pages.
Hasen, "Utility Based Cloud Computing Power!," Computers Journal, Dec. 2008, 2 pages.
Knorr, InfoWorld "What Cloud Computing Really Means," Galen Gruman Apr. 2008, 4 pages.
Khattab et al., "Proactive Server Roaming for Mitigating Denial-of-Service attacks," 2003, pp. 286-290.
Knowledge W.P. Carey, "Cloud Computing: The Evolution of Software-as-a-Service" Published Jun. 4, 2008 in Knowledge@W.P. Carey 3 pages.
Lai et al., "Service Migration—A New Paradigm for Content Distribution Systems," 2008, pp. 34-38.
Micro Focus "Enterprise Cloud Services: Deriving Business Value from Cloud Computing," White Paper, 2008, 13 pages.
Network World, Inc. http://www.networkworld.com "Five Cloud Computing Questions", Industry Commentary by Frank Dzubeck, Network World, Aug. 5, 2008, Copyright 1995-2009, 2 pages.
PDF of Powerpoint "Security Issues in Cloud Computing," date unavailable, 30 pages.
RedPlaid Cloud Computing "Cloud Computing Using VMware Virtual Machines," 2008, 5 pages.
Sangpachatanaruk, et al.; "Design and Analysis of a Replicated Elusive Server Scheme for Mitigating Denial of Service Attacks," *J Systems and Software*, Dec. 2003, pp. 15-29.
Savage, SearchSecurity.com. "Outsourced Security Services to take off," Features Editor, Information Security Magazine, Jul. 2008, 4 pages.
Lohr, "IBM to Push 'Cloud Computing,' Using Data From Afar," New York Times, Nov. 2007, 4 pages.
SYS-CON Media Inc. "Denali of Service, the Pirate Bay is Offline," Updated 10PM EST-Mar. 2-9, 2008, 1 page.
What Possible Computer Disasters can be Associated with Cloud Computing? Submitted as an essay to the University of Kent, Canterbury by ZDNet editor of the iGeneration blog, Zack Whittaker, Nov. 2008, 9 pages.
www.ioactive.com, IOActive Comprehensive Computer Security Services PDF of Powerpoint, "When Irresistible Forces Attack, Security in the Cloud," Dan Kaminsky Direct of Penetration Testing. IOActive, Inc., date unavailable, 32 pages.
European Communication under 71(3) EPC, Invention to grant for Application No. 10 250 871.0, dated Mar. 31, 2017, 7 pages.

* cited by examiner

METHOD AND SYSTEM FOR APPLICATION MIGRATION DUE TO DEGRADED QUALITY OF SERVICE

CROSS REFERENCES TO RELATED APPLICATION

This application is a continuation of application Ser. No. 12/435,596, filed May 5, 2009, entitled "Method and System for Application Migration in a Cloud," to Liu, of which is incorporated herein by reference in its entirety and for all purposes.

BACKGROUND

Cloud computing is poised to revolutionize the prevailing computing paradigm in the very near future. Generally, cloud computing refers to the deployment and use of computer technology over the Internet, wherein computing resources from a larger collection of shared computing resources can be dynamically requisitioned as a service over the Internet. Cloud computing is distinguished from other similar computing paradigms—such as utility computing—in that cloud computing consumers need not have (and are generally precluded from) knowledge of, visibility in, and control over the actual technology infrastructure used to provide the obtained service.

Typically, cloud computing vendors offer clients the ability to access or rent these resources at agreed upon rates. These arrangements can offer significant benefits to clients over traditional enterprise data center network implementations, which typically feature a plethora of computing technology hardware that is privately procured, integrated, secured, and monitored independently. These benefits include providing the ability to provision additional resources on demand, dynamically scale a client's application or system, and limit costs to reflect actual resource usage and consumption. In addition, the advantages inherent to avoiding constructing and maintaining a network Architecture—such as eliminating the time required for hardware procurement and assimilation and the notorious difficulties of software integration—are also provided through the utilization of cloud computing.

The majority of current cloud computing infrastructures consist of numerous servers with varying levels of virtualization technologies. Architecturally, cloud computing data center networks can resemble traditional enterprise architectures, albeit on a (generally) much grander scale. For example, the architecture for a typical data center network for any particular cloud computing vendor may be implemented as a hierarchy of routers and concentric subnets connecting a large network of servers, often numbering in the hundreds or thousands. However, like enterprise infrastructures, cloud computing data center networks are typically under-provisioned, often by a significant factor. This under-provisioning can compromise the efficacy of the network and prevent the network from performing at its supposed level of throughput. Several factors may account for under-provisioning, principally the prohibitive cost of building and maintaining even a modest sized network, and the inherent characteristics of hierarchical network architectures.

The problem of under-provisioning can be mitigated in a traditional corporate data center. The standard practice of traditional corporate data centers is to co-locate servers for an application (e.g., web-servers, application servers and database servers for multi-tiered applications) in the same subnet; thereby localizing the bulk of the communication. Since data center managers have full control over the infrastructure, they can perform the optimizations necessary to avoid undesirable communication patterns. In addition, due to the control, data center managers are able to track down offending applications or put in counter-measures if and when the problems with communication patterns occur.

However, under-provisioning in a Cloud infrastructure could become a problem, due to the distinctions between Cloud computing and traditional corporate data centers. First, a cloud infrastructure is much larger than most corporate data centers. As a result, isolated problems may be more difficult to locate within the infrastructure. Conversely, solutions which are wide in scope may be vastly more difficult to deploy on such a grand scale. For example, a solution may not be compatible for all applications running with the Cloud. Moreover, the larger size of a cloud infrastructure also increases the likelihood that the cloud is under-provisioned, as well as the degree of the under-provisioning. Secondly, a Cloud is a shared public infrastructure. Consequently the consumer may be affected by the usage or consumption of other consumers operating in the same subnet within the Cloud. Finally, Cloud computing consumers have little or no control over the underlying infrastructure in a Cloud. In a corporate data center, an application owner typically has at least an indirect access to the underlying server and network, and thus, can perform optimizations or implement counter-measures in the infrastructure if needed. However, the same consumers have no such capability in a Cloud. On the contrary, the consumers have very limited visibility into and control of the underlying infrastructure.

Unfortunately, the gross under-provisioning and the public nature of a Cloud also open a potential avenue for possible exploitation. The limited bandwidth available in a subnet can be saturated, both intentionally and unintentionally, thereby producing a greatly degraded experience for other users within the same subnet. High volume users within the same subnet can unintentionally compromise the service for other users in the same subnet by legitimately consuming a disproportionate amount (e.g., all) of the available bandwidth for a period of time. Malicious users within the same subnet may be able to intentionally compromise the performance of the entire subnet by executing a Denial-Of-Service (DoS) attack on either a specific user or a general subnet.

Traditional DoS attacks attempt to make a computer resource unavailable to its intended users through a massive and sudden consumption of computing resources (e.g., bandwidth, processing time, storage) and/or disruption of routing information. Generally, a DoS attack operates by saturating a target machine (e.g., a server) with multiple external communications over a concentrated period of time to such a degree that the target's natural constraints are met or exceeded, and the target becomes unable to respond to other legitimate traffic, or responds so slowly to legitimate traffic as to be rendered effectively unavailable for the duration of the attack, or possibly indefinitely. Additionally, the networking devices (e.g., routers) communicatively coupling the target machine to a network (including the Internet) are often easily overwhelmed by a DoS attack, thereby subjecting other devices coupled to the network through the same networking device to suffer.

A DoS attack may be instigated from within a cloud's infrastructure and may also be targeted at a specific user by determining the IP address of the application to attack (i.e., the subnet of the target); requisitioning resources within the target subnet; and unilaterally sending data packets (e.g., user datagram or "UDP" packets) at the maximum rate through a target router controlling the target subnet, thereby consuming all or most of the device's transmission capabilities. Due to the effects of under-provisioning, a DoS attack may require requisitioning only a very small amount of resources relative to the number of servers in the subnet. Unfortunately, compromised performance may not be limited to the directly attacked application in a cloud, as other constituents within the same subnet and using the same router in the cloud would also suffer the effect of the DoS attack on a specific user, specifically, by also experiencing drastically reduced service and data transfer rates. Conversely, a DoS attack may be untargeted, wherein a co-located group of resources is requisitioned within the same subnet and is used to clog the entire subnet's bandwidth through a high volume of transmitted data. Naturally, both targeted and untargeted attacks can result in tremendous losses for all affected users of the afflicted subnet.

Traditional DoS attacks, related distributed Denial-of-Service (DDOS) attacks, and their counter-measures are well known. There are sophisticated techniques to counter even the most elaborate (D) DoS attacks. However, those techniques generally assume that the attack is sending packets directly to an application, and that the application can detect that when direct attack is underway. Unfortunately, within a Cloud, applications sharing a subnet with a compromised subnet may be collaterally affected without having been attacked at all. In many instances, an application will never even be aware that a DoS attack is underway on another application in the same subnet.

The same techniques which may be employed to detect and fend off direct DoS attacks may not be available and/or effective when applied by or to an indirectly affected application in the same subnet. This problem may be further aggravated by the structure and lack of visibility within a Cloud. In addition, the same techniques will not be effective to solve the problem of legitimate, high-volume users that simply exhaust the network's capacity. As with a DoS attack originating from within the cloud infrastructure, a legitimate cloud consumer operating on only a relatively small amount of computing resources can occupy a debilitating amount of the subnet's data transmission capability.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The claimed subject matter is directed to a method and system for managing applications to avoid low bandwidth in a cloud data center by migrating the application to alternate subnets with increased bandwidth.

In the following embodiments, an approach is described for managing an application in a cloud data center to avoid low bandwidth caused by other applications executing in the same subnet. In one embodiment, a cloud data center infrastructure is provided that includes a monitoring agent that manages instances of an application distributed amongst various subnets within the cloud data center. The monitoring agent monitors the health of the channel capacity of the underlying subnet for a particular application. When the networking device used to address and route the underlying subnet is overwhelmed, e.g., via a hostile attack or legitimately high volume usage, the bandwidth shared by all the subnet's constituents may deteriorate. If deterioration beyond a pre-determined threshold is detected, the monitoring agent migrates the application to other (possibly dynamically launched) instances that are determined to be uncompromised.

In another embodiment, a method is provided to avoid low bandwidth in a cloud data center for an application experiencing a reduced bandwidth. According to this embodiment, an application executing in a cloud data center and sharing a network routing device with other applications in a subnet can experience deteriorated bandwidth if the capacity of the network routing device is oversaturated (either from without or within). When the bandwidth of the underlying subnet of an application is detected below a certain pre-determined threshold (e.g., through a denial of service attack on another application in a shared subnet or a high volume neighbor), the application communicates a distress signal with a central agent. Once a suitable alternate instance of the application which was heretofore serving as a stand-by is located, the primary operation of the application may be transferred to the stand-by instance.

In alternate embodiments, a method is provided to manage low bandwidth for an application in a cloud data center. According to this embodiment, a monitoring agent is provided that detects a deterioration of the bandwidth of an application in a cloud data center, due perhaps to an over-consumption of network routing resources from other applications sharing the same subnet. Once deterioration has been detected, the monitoring agent locates a second, suitable instance of the application to assume primary operation of the application. Once a suitable instance of the application is located, primary operation of the application is migrated from the original instance to the identified second instance.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
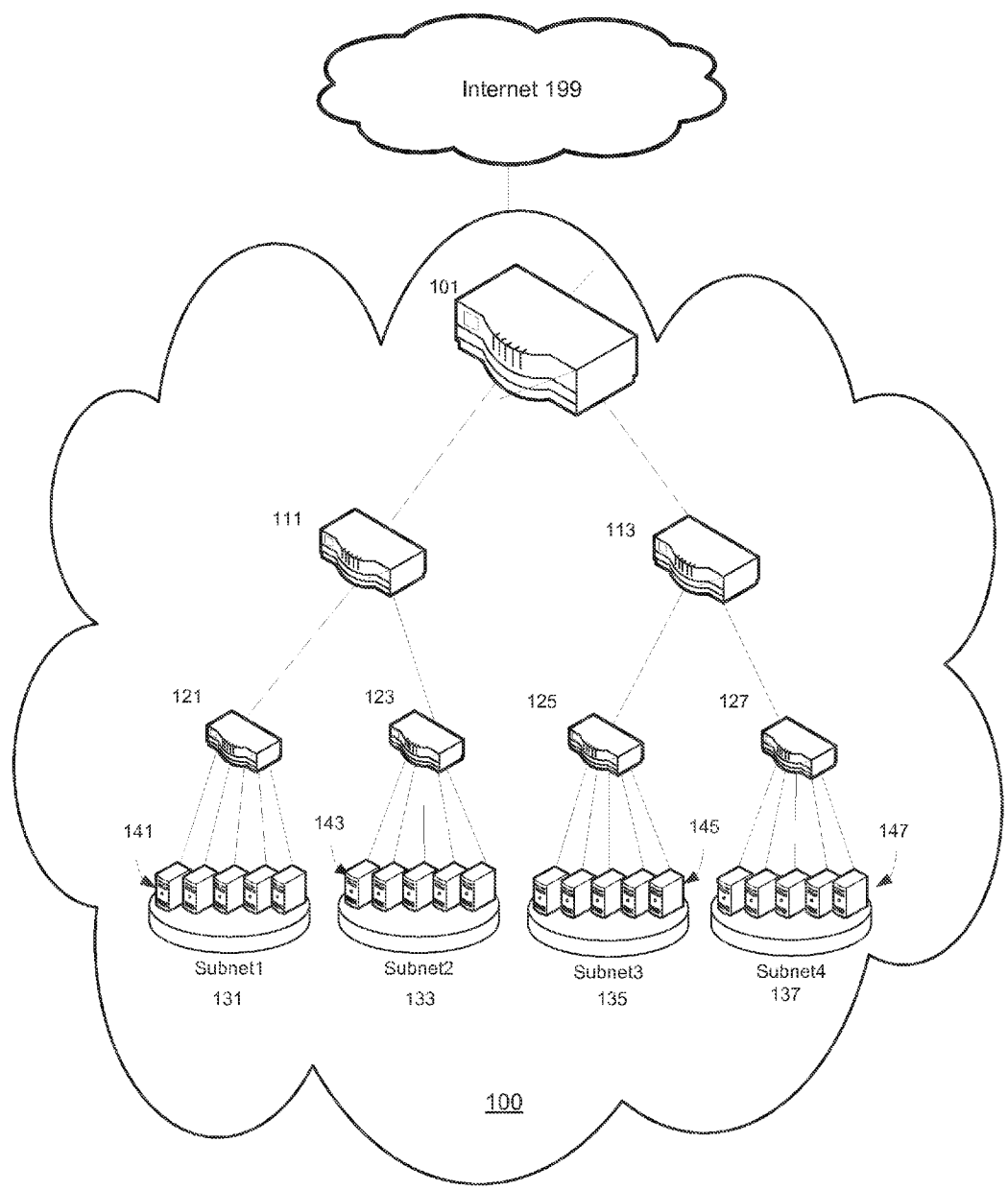
FIG. 1 is an illustration of an exemplary data center, in accordance with various embodiments of the claimed subject matter.

Reference will now be made in detail to the preferred embodiments of the claimed subject matter for managing applications to avoid low and/or compromised bandwidth in a cloud data center, examples of which are illustrated in the accompanying drawings. While the claimed subject matter will be described in conjunction with the preferred embodiments, it will be understood that they are not intended to be limit to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

The claimed subject matter is directed to a method and system for managing applications to avoid low and/or compromised bandwidth in a data center by migrating the primary operation of the application to alternate subnets with increased bandwidth. In one embodiment, the data center may be implemented as a distributed network, such as an enterprise data center or according to a cloud infrastructure Exemplary Cloud Data Center With respect to FIG. 1, an illustration of an exemplary data center 100 is depicted, in accordance with embodiments of the present invention. According to one embodiment, configuration 100 includes a plurality of communicatively interconnected networking devices (e.g., networking devices 101, 111, 113, 121, 123, 125, and 127). The networking devices may, for example, be collectively used to communicatively couple a plurality of computing environments (e.g., computing environments 141) comprising a cloud data center to each other and/or to the Internet.

As depicted, configuration 100 presents a portion of a data center represented in a vertical hierarchy. This graphical representation may be suitable to represent any organization or arrangement of networking devices working in concert to communicatively couple a plurality of computing devices wherein each "tier" of the vertical hierarchy comprising a networking device is successively more powerful (e.g., greater switching capacity and/or faster data transfer rate) than the tier below it, and substantially equivalent to other networking devices in the same tier. Thus, such a graphical representation may represent the infrastructure of a typical cloud data center as well as a typical enterprise data center infrastructure.

In one embodiment, the networking devices are routers. According to other embodiments, the networking devices may be a combination of routers and/or network devices which include layer 2/3 switching and routing functionality. According to some embodiments, the components comprising the data center may be co-located. According to alternate embodiments, the components comprising the data center may be remotely distributed and communicatively coupled via the Internet 199. According to these embodiments, the cloud may be analogous to the Internet, of which the depicted configuration 100 is a comprising portion.

In one embodiment, the networking devices on the lowest tier of networking devices (e.g., networking devices 121, 123, 125 and 127) may be communicatively coupled to one or more computing environments. According to some embodiments, each of the computing environments may be a computing system, such as a personal computing (PC) server or blade server. In a further embodiment, a networking device implemented as a router may have a number of ports, each port configured to be physically coupled to a port of a server or other computing environments 141, 143, 145, 147 (e.g., via a cable). A plurality of computing environments (e.g., computing environments 141) coupled to a networking device (e.g., networking device 121) may form a sub-network, or "subnet" (e.g., Subnet1 131), wherein each of the computing environments 141 share an internet protocol address routing prefix and receive network traffic as routed by the corresponding network device 121. The capacity of the network device is limited and the resources provided are typically shared by each of the coupled computing environments comprised within the corresponding subnet. Thus, an over-consumption by one or more computing environments of the network device's resources could have possible, far-ranging effects on other (perhaps all) subnet constituents, including, for example, severe bandwidth deterioration.

Alternatively, one or more combinations of computing environments 141, 143, 145, 147 and networking devices 121, 123, 125, 127 may collectively form a (larger) subnet. For example, a subnet may be formed from the computing environments 141, 143 coupled to the networking devices 121 and 123 sharing a (typically less specific) routing prefix and receiving network traffic as routed by the overseeing network device 111. Successively larger subnets may be formed having increasingly less specific routing prefixes (e.g., sharing less octet bits in the routing prefix) by including networking devices in higher tiers (and their corresponding coupled lower tiers and/or computing devices). In still further embodiments, one or more virtualized computing environments may be executed from one or more computing environments 141, 143, 145, 147. These virtualized computing environments may also be comprised in the corresponding subnet.

In one embodiment, one or more computing environments 141, 143, 145, 147 and/or a virtualized computing environments may be used as platforms upon which one or more instances of a cloud consumer application may be executed. As presented, the networking device 101 in the highest tier of the vertical hierarchy may also be connected to another networking device (not shown). The graphical illustration of the configuration 100 has been limited to a select portion of a vertical hierarchy for the sake of simplicity and brevity. It is to be understood that embodiments of the claimed subject matter may be well-suited to alternate arrangements and configurations.

Exemplary Application Management System

Figure 2:
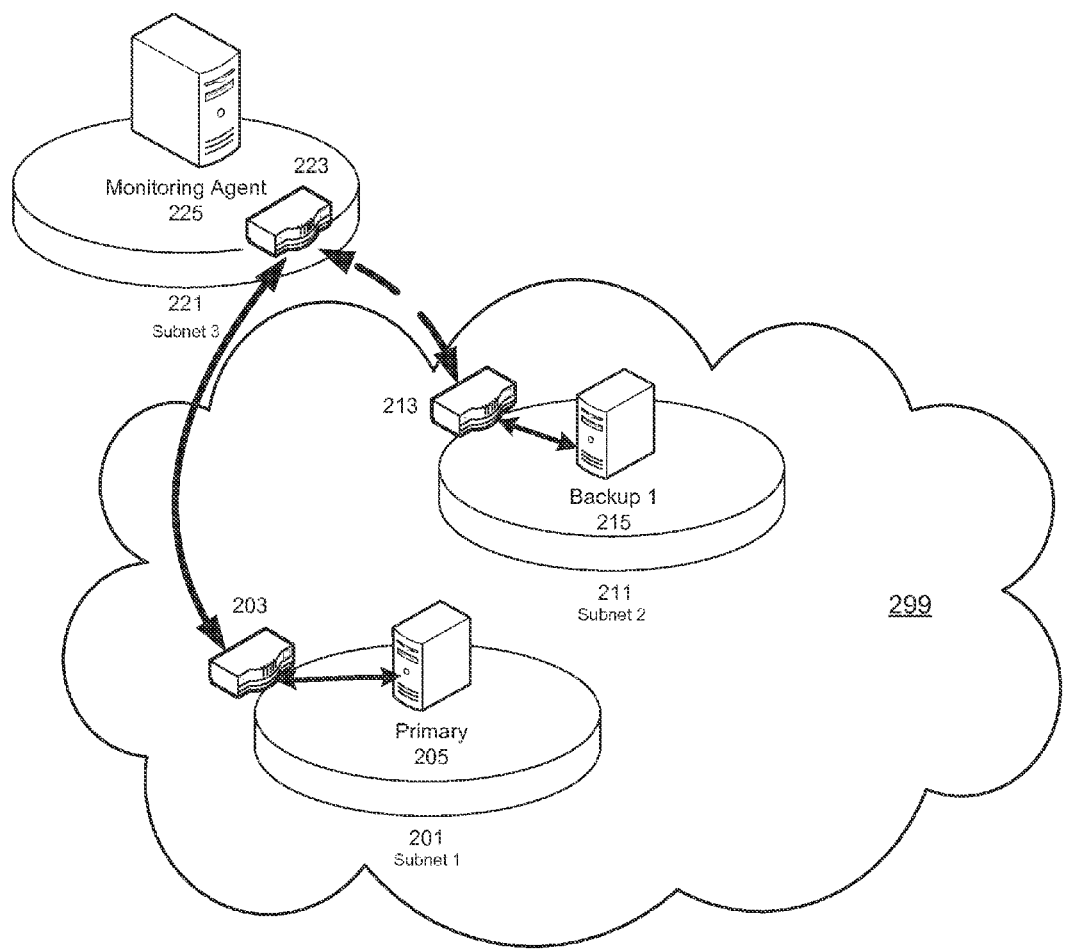
FIG. 2 is an illustration of an exemplary state of an application management system in a data center having a pre-launched stand-by instance, in accordance with various embodiments of the claimed subject matter.

With respect to FIG. 2, an illustration of an exemplary state 200 of an application management system in a data center 299 having a pre-launched stand-by instance is depicted, in accordance with embodiments of the present invention. In a typical configuration, the state 200 includes a primary instance of an application 205 executing in a first computing environment in a first subnet (e.g., subnet 201); a stand-by instance of the application 215 executing in a second computing environment in a second subnet 211; and a monitoring agent 225 executing in a third computing environment in a third subnet 221. As presented, each subnet 201, 211, 221 corresponds to one or more computing environments communicatively coupled to a network (e.g., the Internet, local arena network, etc. . . . ) through a networking device (e.g., networking device 203, 213, 223). In one embodiment, the networking devices 203, 213, 223 may be some combination of routers and edge devices.

As depicted, subnet 1 and subnet 2 are presented within the data center 299. Accordingly, subnet 1 and subnet 2 may contain one or more computing environments included in the collection of computing resources comprising a cloud data center 299. For example, subnet 1 and/or subnet 2 may include a combination of a plurality of hardware computing devices (e.g., servers) and a plurality of virtual machines executing from one or more hardware computing devices, communicatively coupled to one or more routers and/or other networking devices with layer 2/3 switching functionality.

Subnet 3 is presented externally with respect to the data center 299 and may be implemented as, for example, a subnet comprised in an alternate public cloud data center, a private enterprise data center, or a hybrid of the two. As with subnets 1 and 2, subnet 3 may include a combination of a plurality of physical and virtual computing environments. In alternate embodiments, subnet 3 may also be comprised within the data center 299. In one embodiment, subnet 1 is a separate subnet within the data center 299 from subnet 2. In still further embodiments, subnet 3 may be comprised within the data center 299 and may be a subnet separate from both subnets 1 and 2. In alternate embodiments, the third computing environment 225 may, instead of subnet 3, be comprised within the same subnet as the second computing environment 225 (e.g., subnet 2). In further embodiments, the monitoring agent is executed in the second computing environment 225 with the stand-by instance.

In still further embodiments, the primary instance of an application may be executed in a plurality of computing environments co-located in the same subnet. (e.g., subnet 1) According to these embodiments, the monitoring agent may be executed in a hardware-based load balancer designated for the computing environments executing the primary instance of the application. The load balancer may, for example, be comprised in the second subnet (e.g., subnet 2) or, alternatively, in a subnet external to the data center (e.g., subnet 3). In alternate embodiments, the load balancer may be implemented as software executing in a computing environment outside the subnet of the primary instance of the application. In further embodiments, the load balancer and monitoring agent may be executing in the same computing environment.

According to one embodiment, a primary instance of a consumer application is executed from a computing environment 205 in subnet 1. Within embodiments featuring a cloud infrastructure, several other consumer applications executing on one or more other computing environments 205 may be comprised in subnet 1. These applications may comprise a large variety of distinct features and functionality consistent with other web-based applications. These applications also share a single, finite bandwidth, e.g., the routing capacity of the networking device 203. This bandwidth is in large part determined by the specific hardware configuration of the networking device 203.

As with other traditional web-based applications, applications executing from resources located in a cloud may be subject to forms of hostile or malicious service interference. Denial of Service (DoS) attacks and Distributed Denial of Service (DDOS) attacks are well known and typically affect service by saturating a router (e.g., networking device 203 of a subnet 201 with traffic, typically sent from a large host of remote, distributed sources (not shown) and thereby consuming potentially large amounts of bandwidth, resulting in a much deteriorated bandwidth for constituents of the router's subnet. Within a cloud infrastructure, Denial of Service attacks may be performed by requisitioning a relatively small amount of resources and sending a large amount of traffic within a duration, thereby consuming the entirety of a networking device's routing capacity and rendering the device incapable of routing other, legitimate traffic.

According to one embodiment, the primary instance of the application continuously monitors the health of the bandwidth in the subnet (subnet 1). According to further embodiments, the health of the bandwidth may be monitored by the monitoring agent 225. This exchange is denoted by the arrow conjoining the networking device of subnet 1 (networking device 203) to the networking device of subnet 3 (networking device 223). According to further embodiments, the monitoring agent 225 may periodically monitor the health of the bandwidth for the stand-by instance 215. This exchange is denoted by the broken arrow conjoining the networking device of subnet 3 (networking device 223) to the networking device of subnet 2 (networking device 213). According to other embodiments, the monitoring agent 225 may continuously monitor the health of the bandwidth of the stand-by instance 215. Alternatively, the stand-by instance 215 may monitor its own bandwidth, which it communicates to the monitoring agent 225.

Figure 3:
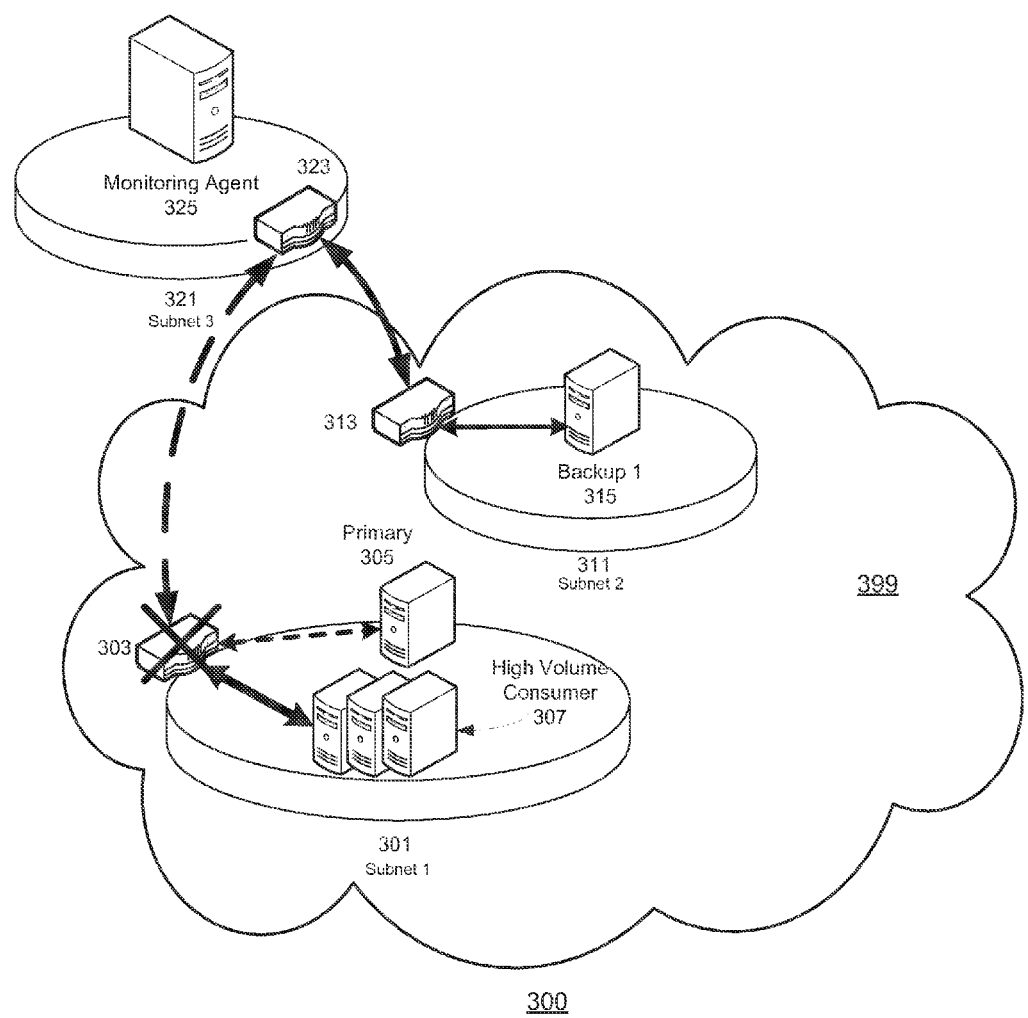
FIG. 3 is an illustration of an exemplary state of an application management system in a data center having a pre-launched stand-by instance when the bandwidth of a primary operating instance of an application is compromised, in accordance with various embodiments of the claimed subject matter.

FIG. 3 depicts an illustration of an exemplary state 300 of an application management system in a data center 399 having a pre-launched stand-by instance when the bandwidth of a primary operating instance of an application is compromised, in accordance with embodiments of the present invention. As shown, the state 300 includes a primary instance of an application 305 and high volume consumer applications 307, both executing in from computing environments in a first subnet 301; a stand-by instance of the application executing in a second computing environment 315 in a second subnet 311; and a monitoring agent executing in a third computing environment 325 in a third subnet 321. Also presented is a plurality of networking devices 303, 313, 323 corresponding to each subnet 301, 311, 321.

The high volume consumer applications 307 may produce sufficient traffic within the data center 399 to saturate the networking device 303, thereby consuming the resources of the networking device 303 and negatively impacting the service to other applications (e.g., a primary instance of an application executing on computing environment 305) executing from the subnet 301. The high volume consumer applications 307 may, for example, be malicious consumers launching a DoS attack against one or more other applications in the subnet. Alternatively, high volume consumer applications 307 may simply be a high volume consumer occupying a disproportionate amount of bandwidth (e.g., by transmitting large amounts of data under the UDP data transport protocol). This negative impact may be expressed as greatly reduced bandwidth for other subnet members.

As long as a networking device 303 continues to be saturated, other constituents of the subnet (subnet 1) may experience significantly reduced quality of network service. If either the monitoring agent 325 or the primary instance of the application 305 detects a significant drop in the bandwidth available in subnet 1, the primary instance of the application will communicate this effect to the monitoring agent 325. In one embodiment, the communication will be made when the subnet's bandwidth is reduced below a pre-determined threshold. According to further embodiments, once the deteriorated bandwidth in subnet 1 has been communicated to the monitoring agent 325, the monitoring agent may begin to actively measure the bandwidth of the stand-by instance 315. This measurement may be accomplished by, for example, calculating the difference in arrival times of data packets to the stand-by instance. If the bandwidth available to the stand-by instance 315 is determined to be greater than the bandwidth in subnet 1, the monitoring agent 325 may begin the process of transferring primary operation of the application to the stand-by instance.

Figure 4:
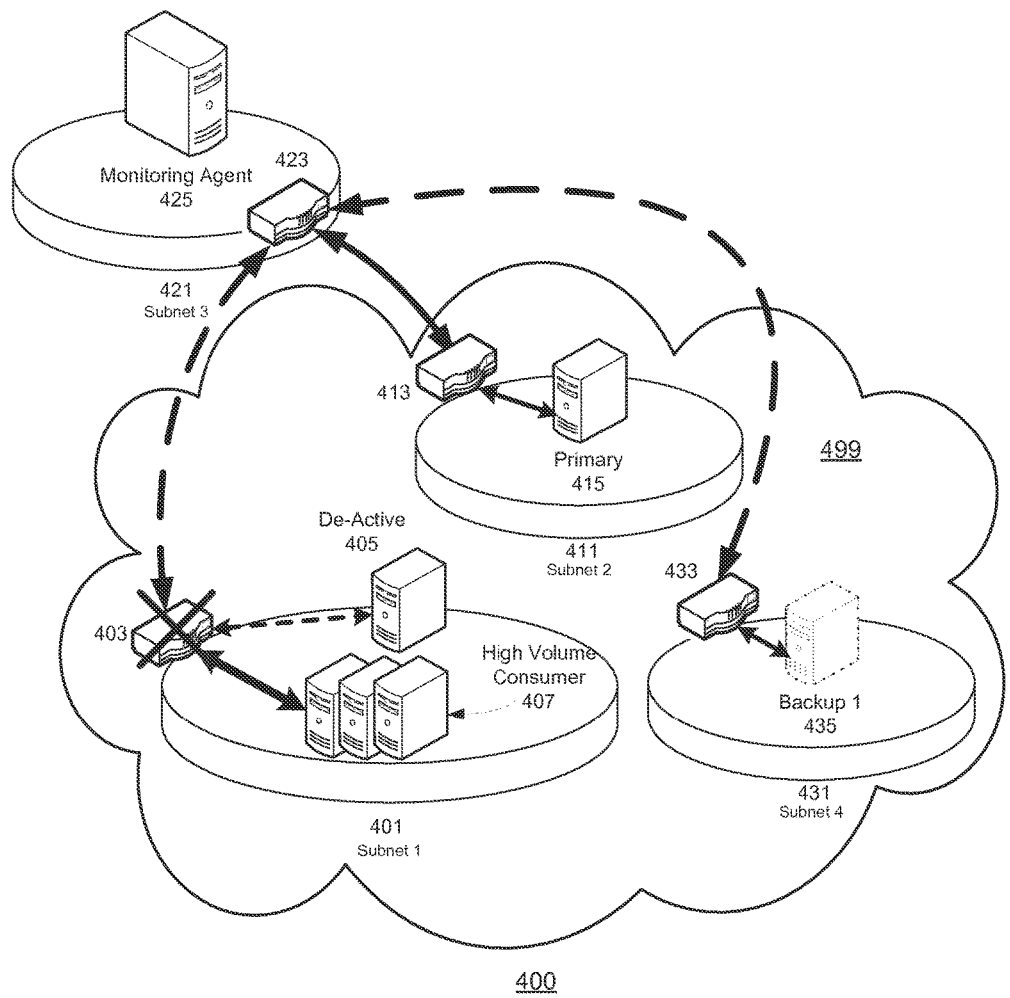
FIG. 4 is an illustration of an exemplary state of an application management system in a data center featuring a pre-launched stand-by instance after a primary operation of an application is transferred, in accordance with various embodiments of the claimed subject matter.

FIG. 4 depicts an illustration of an exemplary state 400 of an application management system in a data center 499 having a pre-launched stand-by instance after a primary operation of an application is transferred, in accordance with embodiments of the present invention. Configuration 400 depicts the state subsequent to the transfer of primary operation from a former primary instance (e.g., former primary instance 405) to the former stand-by instance (e.g., backup instance 415). As presented, configuration 400 includes a de-activated, formerly primary instance (e.g., primary instance 305 of FIG. 3) of an application 405 in a first subnet 401 with high volume consumer applications 407, new primary (former stand-by) instance (e.g., 315 of FIG. 3) of the application 415 executing in a second computing environment in a second subnet 411; and a monitoring agent 425 executing in a third computing environment in a third subnet 421.

In one embodiment, state 400 also includes a dynamically launched new stand-by instance 435 in a fourth computing device in a fourth subnet 431. The new standby instance 435 may be created, for example, as a back up to the new primary instance of the application 415. Also presented is a plurality of networking devices 403, 413, 423 and 433, corresponding to each subnet 401, 411, 421 and 431 for communicatively coupling and distributing data for the plurality of computing environments in each of the subnets 401, 411, 421, 431.

The states 200, 300, 400 described with reference to FIGS. 2-4 depict a process for migrating a primary operation of an application in a data center, such as a cloud data center. According to further embodiments, the states 200, 300 and 400 may be repeated for each successive migration so as to perform a plurality of migrations or "application hopping" to pro-actively avoid further requisitioned DoS attacks.

Figure 5:
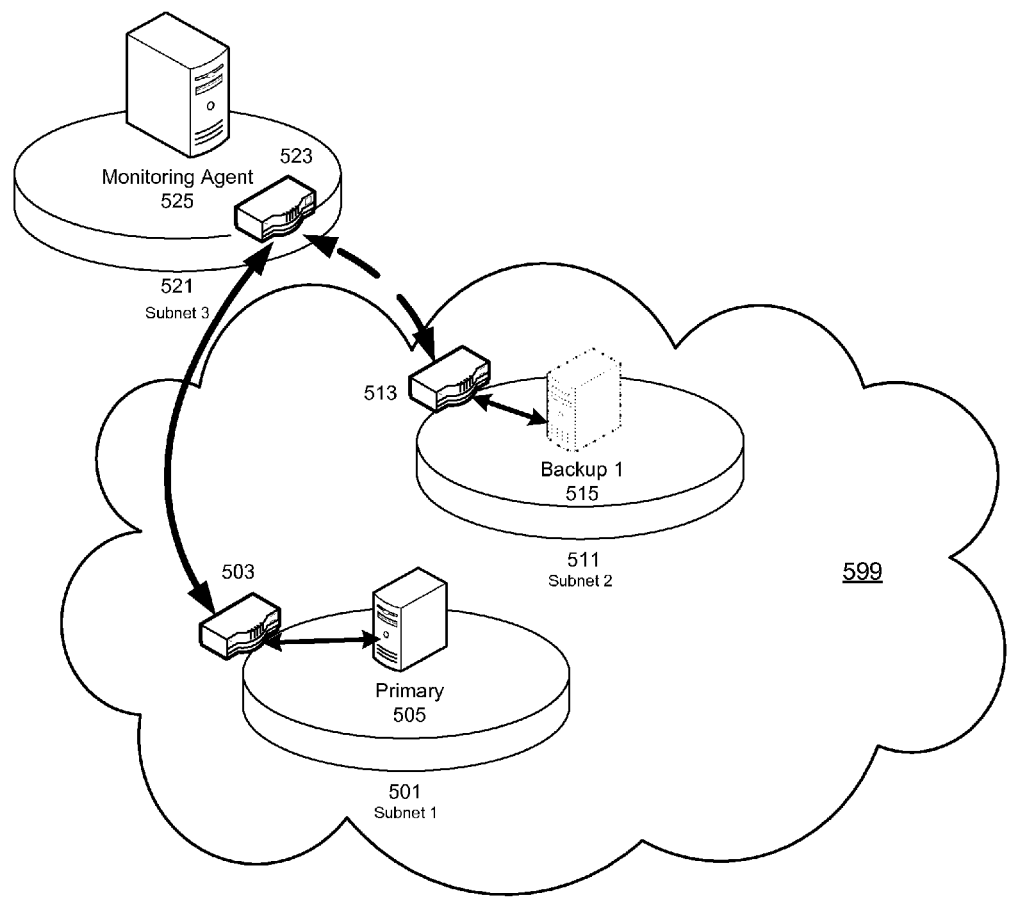
FIG. 5 is an illustration of an exemplary state of an application management system in a data center depicting a dynamically launched new stand-by instance, in accordance with various embodiments of the claimed subject matter.

With respect to FIG. 5, an illustration of an exemplary state 500 of an application management system in a data center 599 with a dynamically launched new stand-by is depicted, in accordance with embodiments of the present invention. In a typical configuration, the state 500 corresponds to like numbered features as described above with reference to FIG. 2, including a primary instance of an application 505 executing in a first computing environment in a first subnet (e.g., subnet 501); a second subnet 511; and a monitoring agent 525 executing in a third computing environment in a third subnet 521. As presented, each subnet 501, 511, 521 corresponds to one or more computing environments communicatively coupled to a network (e.g., the Internet, local arena network, etc. . . . ) through a networking device (e.g., networking device 503, 513, 523). In one embodiment, the networking devices 503, 513, 523 may be some combination of routers and edge devices and may be used to direct data within and beyond the data center 599.

According to one embodiment, the primary instance of the application continuously monitors the health of the bandwidth in the subnet (subnet 1). According to further embodiments, the health of the bandwidth may be monitored by the monitoring agent 525. This exchange is denoted by the arrow conjoining the networking device of subnet 1 (networking device 503) to the networking device of subnet 3 (networking device 523). According to further embodiments, the monitoring agent 525 may periodically estimate the health of the bandwidth in alternate subnets (e.g., subnet 2). This exchange is denoted by the broken arrow conjoining the networking device of subnet 3 (networking device 523) to the networking device of subnet 2 (networking device 513). If the monitoring agent 525 detects a deterioration of the bandwidth in subnet 1, the monitoring agent 525 can dynamically launch a back up instance of the application 515 in subnet 2 if subnet 2 is found suitable (e.g., having an uncompromised bandwidth). Once launched, the monitoring agent 525 may direct the migration of the primary operation of the application from the primary instance 505 to the dynamically launched instance 515.

Figure 6:
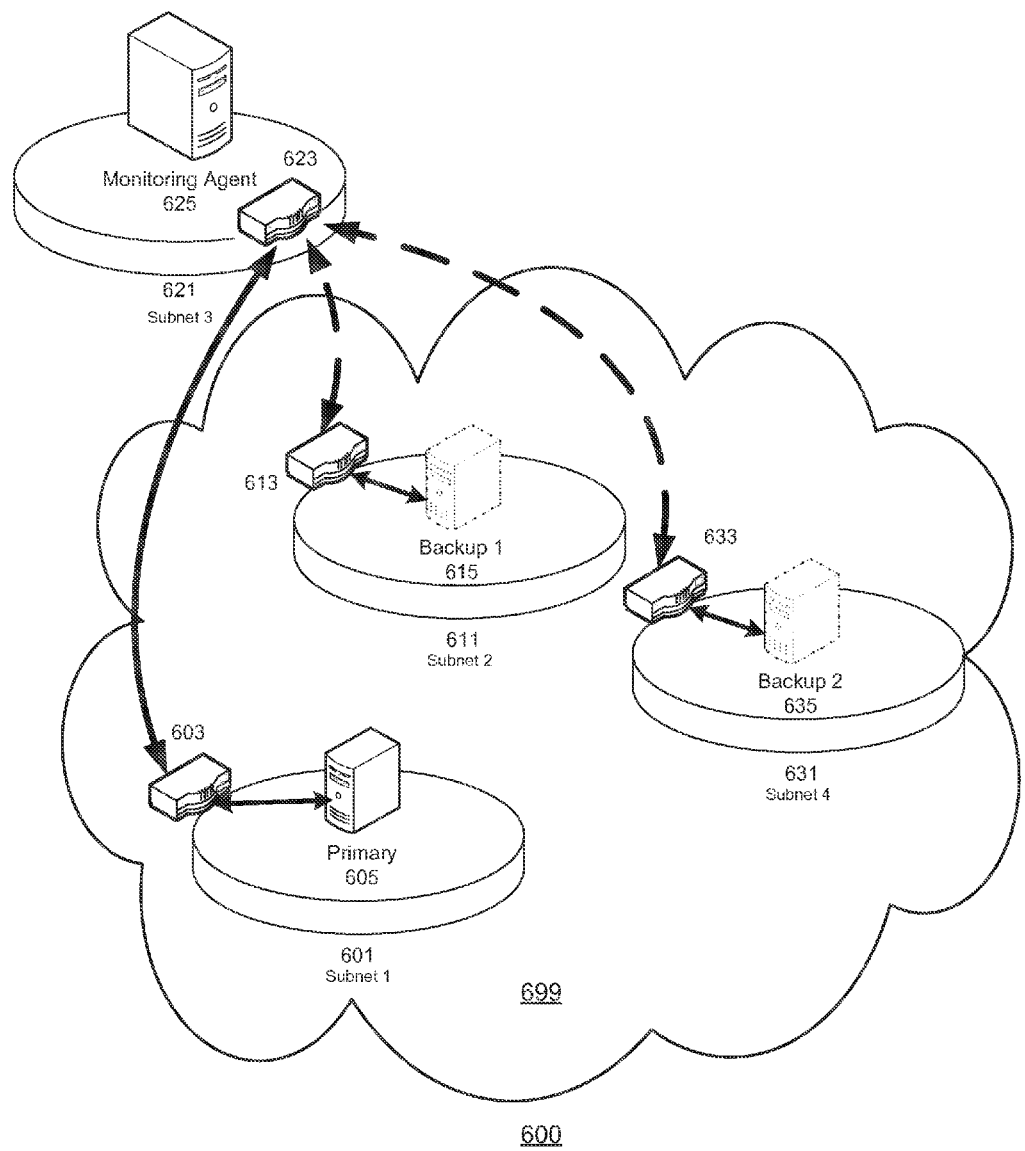
FIG. 6 is an illustration of an exemplary state of an application management system in a data center depicting the transfer of a primary operating instance and a plurality of dynamically launched new stand-by instances, in accordance with various embodiments of the claimed subject matter.

FIG. 6 depicts an illustration of an exemplary state 600 of an application management system in a data center 699 depicting the transfer of a primary operating instance 605 and a plurality of dynamically launched new stand-by instances 615, 635. As with exemplary state 500 described above with reference to FIG. 5, exemplary state 600 includes a primary instance of an application 605 executing in a first computing environment in a first subnet; a second subnet 611; and a monitoring agent 625 executing in a third computing environment in a third subnet 621. Exemplary state 600 also includes a fourth subnet 631. As presented, each subnet 601, 611, 621 and 631 corresponds to one or more computing environments communicatively coupled to a network (e.g., the Internet, local arena network, etc. . . . ) through a networking device (e.g., networking device 603, 613, 623, 633).

According to one embodiment, health of the bandwidth in the subnet (subnet 1) is continuously monitored by the monitoring agent 625, which may periodically estimate the health of the bandwidth in alternate subnets (e.g., subnet 2 and subnet 3). If the monitoring agent 625 detects a deterioration of the bandwidth in subnet 1, the monitoring agent 625 can dynamically launch a back up instance of the application 615 in subnet 2 if subnet 2 is found suitable (e.g., having an uncompromised bandwidth). Alternatively, if subnet 2 is not suitable, that is, if the bandwidth of subnet 2 also experiences a deterioration of its bandwidth, monitoring agent 625 can dynamically launch a back up instance of the application 615 in subnet 3, and so on until a subnet with a suitable bandwidth is detected and a stand-by instance is launched. Once launched, the monitoring agent 625 may direct the migration of the primary operation of the application from the primary instance 605 to the dynamically launched instance.

Figure 7:
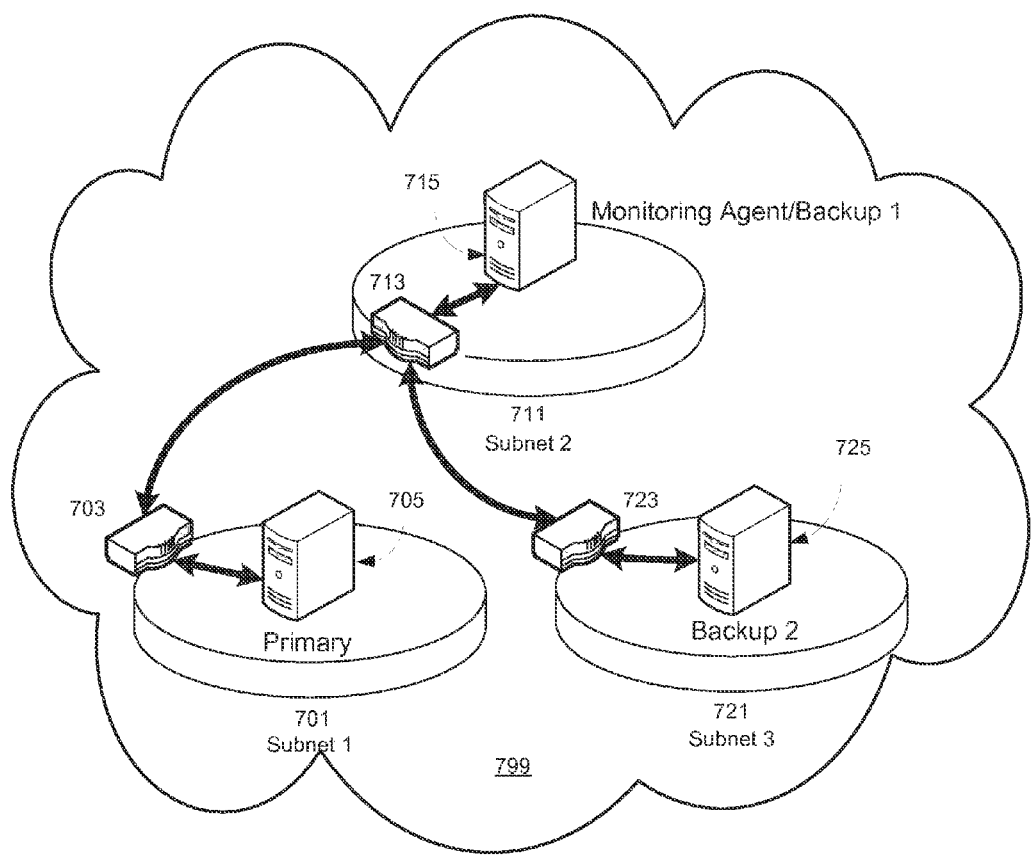
FIG. 7 is an illustration of an exemplary configuration of an application management system in a data center featuring a monitoring agent implemented with a stand-by instance, in accordance with various embodiments of the claimed subject matter.

With respect to FIG. 7, an illustration of an exemplary configuration 700 of an application management system in a data center 799 featuring a monitoring agent implemented with a stand-by instance is depicted. As presented, configuration 700 includes a plurality of computing resources arranged in a plurality of sub-networks. Specifically, a plurality of computing environments (e.g., computing environment 705, 715, 725) distributed within the plurality of sub-networks and communicatively coupled to the network via a plurality of networking devices (e.g., networking devices 703, 713, 723). Configuration 700 also includes a primary instance of an application 705 executing in a first computing environment in a first subnet (e.g., subnet 701); a stand-by instance of the application 715 executing in a second computing environment in a second subnet 711; and a second backup or stand-by instance 725 executing in a third computing environment in a third subnet 721. As presented, a monitoring agent may be implemented with the stand-by instance of the application 715.

According to one embodiment, the monitoring agent implemented with the stand-by instance 715 continuously monitors the health of the bandwidth in the first subnet (subnet 701) and the health of its own bandwidth (e.g., the bandwidth available in the second subnet 711). If the monitoring agent 715 detects a deterioration of the bandwidth in subnet 1, the monitoring agent 715 can direct the migration of primary operation of the application from the instance in subnet 1 (e.g., subnet 701) to the backup instance executing with the monitoring agent in subnet 2 if the bandwidth of subnet 2 is determined to be free of deterioration (e.g., via a DoS attack or particularly high volume subnet constituents).

Migrating Applications

In one embodiment, a data center network comprises the aggregation of a host of computing environments distributed among a plurality of subnets, wherein each subnet may include a plurality of computing environments. The computing environments within the subnets are communicatively coupled between and amongst each other in the network infrastructure and physically routed via data routing network devices. These network devices, which are shared by the computing environments of one or more subnets, have finite limits to the amount of data that can be processed (e.g., routed). Due to under-provisioning, this can lead to a physical routing bottleneck which can be compromised with relative ease by hostile or over-consuming subnet members. Accordingly, a consumer application executing on one computing environment in a subnet may find itself subject to deteriorated service (e.g., a drastically reduced bandwidth) as a result of actions taken upon, or by, other constituents of the same subnet. In one embodiment, the consumer application is executed as a primary instance of the application and is managed by a monitoring agent executed in a computing environment distributed in an alternate subnet.

Figure 8:
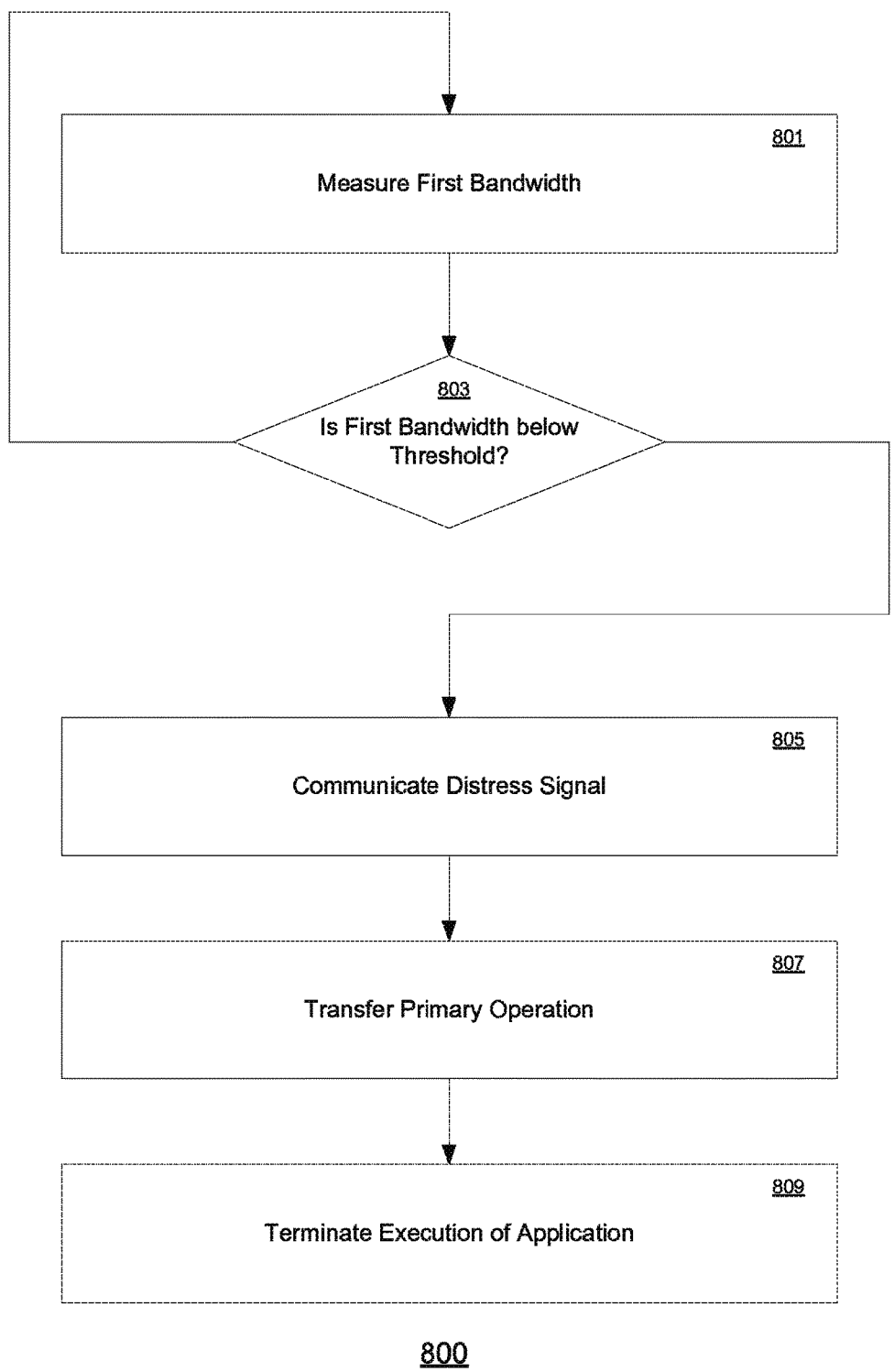
FIG. 8 is a flowchart depicting an exemplary method for migrating an operation of an application from a first computing environment to a second computing environment, in accordance with various embodiments of the claimed subject matter.

FIG. 8 is a flowchart depicting an exemplary method 800 for migrating an operation of an application from a first computing environment to a second computing environment, in accordance with various embodiments of the claimed subject matter. Although specific steps are disclosed in flowchart 800 (and flowchart 900 and flowchart 1000), such steps are exemplary. That is, embodiments of the present invention are well suited to performing various other (additional) steps or variations of the steps recited in flowchart 800, 900 and 1000. It is appreciated that the steps in flowchart 800, 900 and 1000 may be performed in an order different than presented, and that not all of the steps in flowchart 800, 900 and 1000 may be performed. Steps 801-809 describe exemplary steps comprising the method 800 in accordance with the various embodiments herein described.

According to the process 800, a first computing environment upon which a primary operation of an application is executed is provided data trafficking service through a networking device. This networking device may be shared with other computing environments, the sum of the shared computing environments directly coupled to the networking device forming a subnet. The service provided by the networking device, (e.g., its ability to distribute network traffic) has a finite limit that is shared with the multiple constituents of the corresponding subnet. The quality of service provided by the networking device (and, consequently, experienced by the constituents of the subnet) may be degraded. This degradation may be determined at the computing environment, whereupon the traffic routed to the computing environment may be detected at the networking interface card (NIC) of the computing environment. In one embodiment, the degradation is detected at the subnet level by a monitoring agent corresponding to the application executing in the first computing environment.

Steps 801 through 805 describe exemplary steps which may be performed to detect the degradation. At step 801, the bandwidth available to a consumer application executing in a computer environment and communicatively coupled to a networking device in a data center network is measured. In one embodiment, the computing environment is one of a plurality of other computing environments communicatively coupled to the same networking device, with the plurality of computing environments communicatively coupled to the same networking device comprising a subnet. Measurement of the bandwidth available to the first instance of the application may consist of, for example, estimating the unoccupied channel capacity available through the corresponding networking device (e.g., router) of the subnet.

At step 803, the bandwidth measured in step 801 is compared to a threshold. In one embodiment, the threshold may be a predetermined threshold, such as a data transmission rate, latency, etc. In one embodiment, the threshold may be determined to delineate the channel capacity available through the corresponding networking device during the estimated range of normal operation. If the bandwidth measured in step 801 is above the threshold, the steps 801 and 803 are repeated. Otherwise, the process proceeds to step 805.

At step 805, the bandwidth available to the application in its subnet was determined to be below a threshold and the application communicates a distress signal to a monitoring agent executed in a computing environment distributed in an alternate subnet. Communicating the distress signal may comprise, for example, sending a large number of packets to the monitoring agent to request assistance and/or notifying the monitoring agent of the deterioration of the bandwidth. In one embodiment, the packets are sent as UDP packets using the UDP transfer protocol. By sending the packets with the UDP transfer protocol, the packets are able to compete with other high volume traffic (e.g., via a DoS attack on another application in the same subnet). Thus, even during total bandwidth starvation, a portion of the UDP packets from the distressed application would reach its destination (e.g., the monitoring agent).

At step 807, once the monitoring agent receives a distress signal from the consumer application, the monitoring agent initiates a process for migrating a primary operation from the current primary instance of the application to an alternate instance of the application executing in a computing environment operating in an alternate subnet. In one embodiment, initiating the process for migrating the primary operation can include providing acknowledgement that the distress signal sent in step 805 was received.

According to further embodiments, initiating the progress for migrating the primary operation can also include a notification to the current primary instance of the application to begin termination and/or to save its current state of operation and/or perform other actions to facilitate the transfer of primary operation to another instance. In one embodiment, the notification(s) to the current primary instance of the application may be delivered as UDP packets.

According to some embodiments, a monitoring agent which receives a distress signal can send a notification to the current primary instance of the application to begin termination at step 807. Once the current primary instance of the application receives the notification, the instance can terminate its execution of the application at step 809.

Measuring Bandwidth Available to an Instance of an Application

Figure 9:
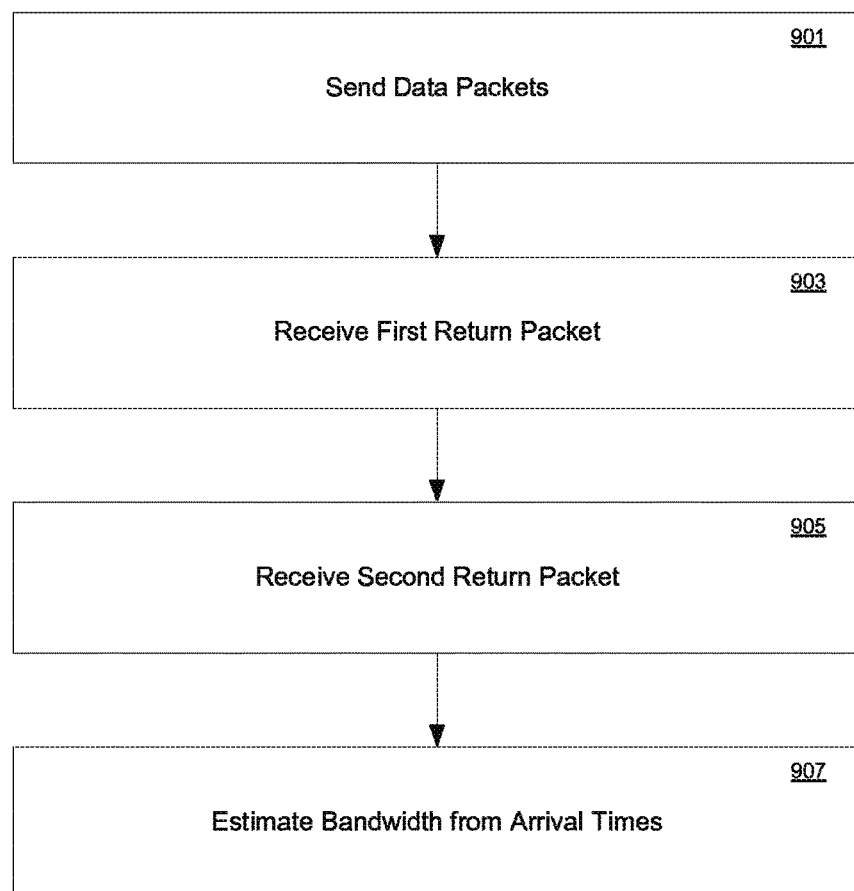
FIG. 9 is a flowchart depicting an exemplary method for measuring a bandwidth available to a subnet in a data center, in accordance with various embodiments of the claimed subject matter.

With reference to FIG. 9, a flowchart depicting an exemplary method 900 for measuring a bandwidth available to a subnet in a cloud data center is depicted, in accordance with various embodiments of the claimed subject matter. Steps 901-907 describe exemplary steps comprising the method 900 in accordance with the various embodiments herein described. In one embodiment, steps 901-907 can comprise the steps performed in step 801 as described above with reference to FIG. 8.

At step 901, the bandwidth of a subnet is measured by an application by sending a plurality of marked data packets to a location external to the subnet. In one embodiment, the data packets may be sent to, for example, a monitoring agent managing the particular instance of the application. According to alternate embodiments, the data packets may be sent to other destinations either within the data center or without. In one embodiment the data packets are marked (e.g., the data packet is distinguished from other data packets). The data packet may be transmitted according to, for example, the TCP protocol. In a typical embodiment, the plurality of marked data packets is sent in pairs, wherein the data packets in a pair are sent consecutively (e.g., one after the other) as a first data packet and a second data packet.

At step 903, a first return packet (e.g., the "echo" of the first data packet) corresponding to the first data packet is received at a first arrival time. The first return packet may comprise, for example, an acknowledgement packet sent from the destination of the first data packet. In other embodiments, the first data packet may be re-routed at the destination and received as the first return packet.

At step 905, a second return packet corresponding to the second data packet is received at a second arrival time. The second return packet may comprise, for example, an acknowledgement packet sent from the destination of the second data packet. In other embodiments, the second data packet may be re-routed at the destination and received as the second return packet.

At step 907, the bandwidth is estimated by measuring the difference between the first arrival time and the second arrival time, accounting for the (typically slight) disparity in transfer times. A larger difference between the first and second arrival time indicates a reduced bandwidth. Likewise, an insignificant difference between arrival times indicates a bandwidth free from deterioration. In a further embodiment, the first data packet and second data packet may be received by a monitoring agent, and the bandwidth of the subnet at the origin of the data packets (e.g., the bandwidth of the application) may be estimated by the disparity in arrival times between the first data packet and the second data packet in a pair.

According to alternate embodiments, measurement of the bandwidth of a subnet may be performed by sending a plurality of single probe packets to an external location and measuring the queueing delay at the networking device of the subnet. The available bandwidth may be estimated through an inverse correlation from the queueing delay, wherein the greater the delay, the less the available bandwidth available in the subnet.

Managing an Application to Avoid Low Bandwidth

Figure 10:
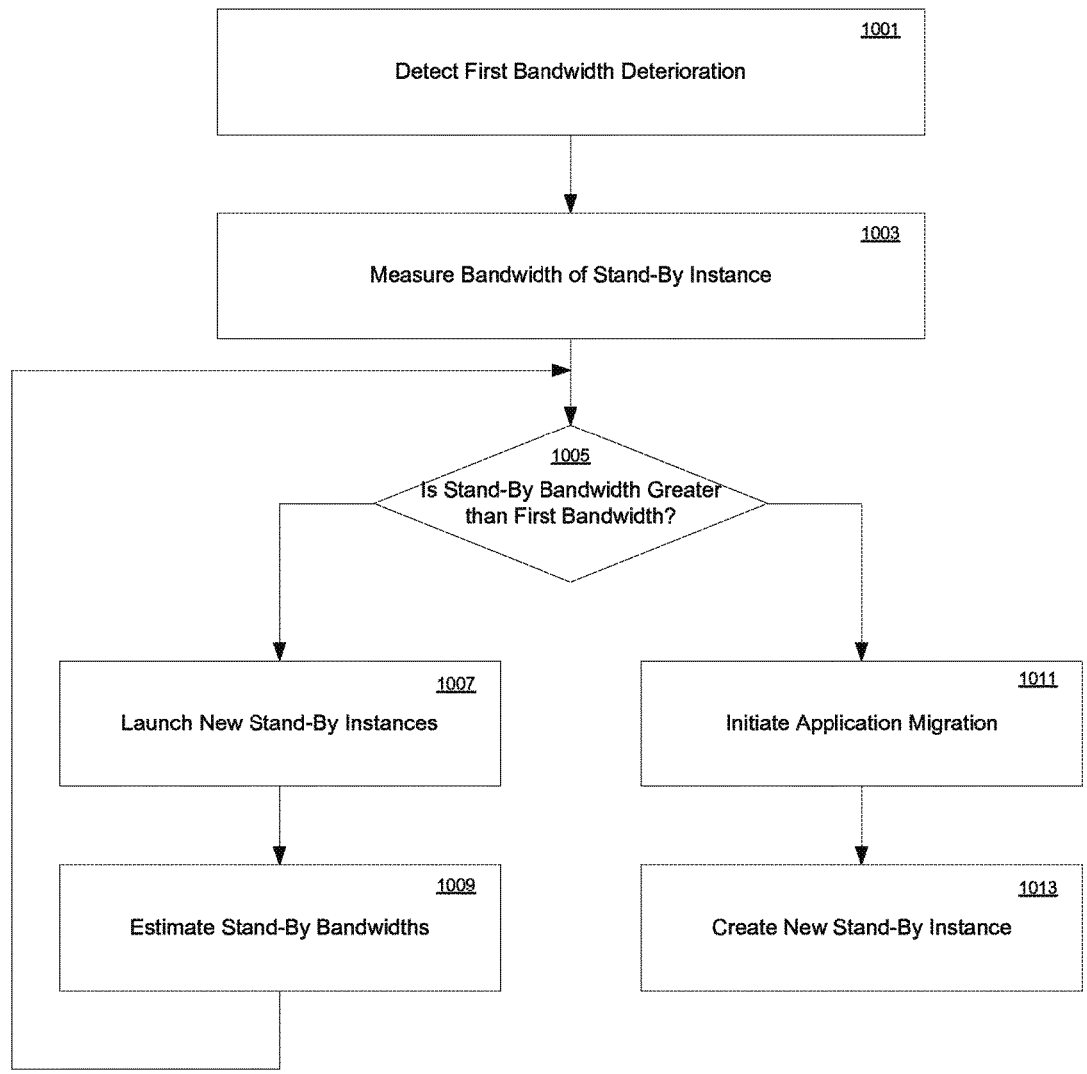
FIG. 10 is a flowchart depicting an exemplary method for managing an application to avoid low bandwidth in a data center, in accordance with various embodiments of the claimed subject matter.

With reference now to FIG. 10, a flowchart depicting an exemplary method 1000 for managing an application to avoid low bandwidth in a data center is depicted, in accordance with various embodiments of the claimed subject matter. Steps 1001-1013 describe exemplary steps comprising the method 1000 in accordance with the various embodiments herein described At step 1001, a monitoring agent detects a deterioration of a bandwidth of the primary operating instance of an application being monitored by the agent. In one embodiment, the primary operating instance of the application is executed on a computing environment (e.g., a server, virtual machine, etc. . . . ) in a subnet of a cloud data center. The monitoring agent may be executed in a computing environment in an alternate subnet of the same cloud data center or, alternatively, in a subnet of an external network. In further embodiments, the monitoring agent is executed in a private corporate data center communicatively coupled to the cloud data center. Detecting the deterioration of the bandwidth of the primary operating instance may consist of, for example, receiving a distress communication from the primary instance of the application comprising a notification of the deteriorated condition. In further embodiments, the monitoring agent may manage a plurality of primary operating instances and thus, may receive communications from one or more of the primary instances of the application. According to these embodiments, the monitoring agent may filter the distress communications to eliminate duplicate messages from the same instance.

Alternatively, in one embodiment the monitoring agent proactively detects the deterioration of the bandwidth of the primary instance(s) of the application by estimating the bandwidth, comparing the bandwidth with a first pre-determined threshold and determining the first bandwidth is lower than the first pre-determined threshold. The first pre-determined threshold may comprise, for example, the delineation between the range of normal traffic at peak times and significantly compromised channel capacity. In one embodiment, estimating the bandwidth may be executed by sending a plurality of marked data packets to the primary instance of the application, receiving the plurality of return packets corresponding to the plurality of marked data packets and estimating the bandwidth from the difference in arrival times between the plurality of return packets.

Once one or more distress communications have been received from a primary operating instance of an application in step 1001, the monitoring agent determines a suitable stand-by instance of the application to assume primary operation of the application by measuring the bandwidth available to one or more stand-by instances of the application at step 1003. In one embodiment, the stand-by instance of the application is a pre-launched instance operating as a stand-by instance for the primary operating instance, executing on a computing environment in a second subnet. In some embodiments, the stand-by instance may be executed in the same computing environment as the monitoring agent. Accordingly, measuring the bandwidth available consists of determining the bandwidth available to the second instance of the application in the second subnet. In further embodiments, the bandwidth of the stand-by instance is periodically measured by the monitoring agent while the stand-by instance is operating. According to these embodiments, the bandwidth of the monitoring agent may be already determined, wherein the method proceeds to step 1005, or, alternatively, may be further confirmed by a subsequent measurement.

Alternatively, in some embodiments, there is no pre-launched stand-by instance operating as a stand-by instance for the primary operating instance. According to these embodiments, a new stand-by instance may be dynamically launched (e.g., computing resources required may be requisitioned on demand and appropriate software loaded) in a second subnet. Once the new stand-by instance is launched, the bandwidth may be measured. In one embodiment, the bandwidth of the stand-by instance may be measured according to the process 900 described above with reference to FIG. 9.

At step 1005, the bandwidth of the stand-by instance determined in step 1003 is compared to a second pre-determined threshold. In one embodiment, the second pre-determined threshold is greater than the bandwidth of the current primary operating instance. In further embodiments, the second pre-determined threshold is indicative of a bandwidth free from deterioration. If the bandwidth of the stand-by instance is determined to be above the second pre-determined threshold, the method proceeds directly to step 1011. Otherwise, if the bandwidth of the stand-by instance is determined to be equal to or below the second pre-determined threshold, the method proceeds to step 1007.

If the bandwidth of the stand-by instance was determined in step 1005 to be equal to or below the second pre-determined threshold, one or more additional instances of the application are launched at step 1007 as primary operating instance candidates. In one embodiment, each of the additional instances of the application is launched in a subnet different from each other, as well as from the first and second subnets. The bandwidths available to the instances are estimated in step 1009. Alternatively, if instances of the application have been pre-launched, the pre-launched instances of the application instead are examined in step 1009. At step 1009, the bandwidths corresponding to each of the primary operating instance candidates are estimated. Estimating a bandwidth of a primary operating instance candidate may be performed as the method 900 described above with respect to FIG. 9. Once a bandwidth of a primary operating instance candidate is estimated, the bandwidth is compared to the second pre-determined threshold (as in step 1005 referenced above), wherein the process 1000 is repeated beginning from step 1005.

If the bandwidth of the stand-by instance was determined in step 1005 to be above the second pre-determined threshold, a migration of the application executing in the first computing system to the second computing system is initiated at step 1011. Migration of the application may comprise, for example, transferring primary operation of the application from the former primary operating instance executed in the computing device in the first subnet (e.g., the subnet experiencing deteriorated bandwidth) to the new primary operating instance (e.g., the former stand-by instance) executed in an alternate subnet determined in step 1005 to be relatively free from deterioration. In addition, initiating migration of the application may include: deactivating the former primary operating instance of the application and providing notification to the former primary operating instance to terminate operation and perform any operations required to facilitate migration (e.g., saving the progress of any current transactions).

In one embodiment, consumers in a cloud data center are able to modify the static IP address of a requisitioned computing environment. According to these embodiments, migration of the application may also include switching the static IP address of the computing environment executing the stand-by instance to the static IP address of the computing environment executing the current primary instance of the application, such that, after migration the static IP address of the instance wherein primary operation of the application is executed remains the same (e.g., the former stand-by instance will have the same static IP address as the former primary operating instance). Accordingly, by preserving the static IP address through migration, the method advantageously prevents 3.sup.rd party clients of the application from unnecessary delays of service required due to caching of DNS resolution.

Alternatively, in some embodiments, consumers in a cloud data center are not able to modify the static IP address(es) of requisitioned computing resources. According to these embodiments, migration of the application may include changing the DNS translation of the domain name corresponding to the application. In further embodiments, changing the DNS translation of the domain name may consist of, for example, changing the translation of the domain name corresponding to the application in one or more name servers from translating to the IP address of the first (former primary operating) instance of the application to the new primary operating (former stand-by) instance of the application.

At step 1013, the new primary operating instance of the application is activated and a new stand-by instance of the application is launched for the new primary operating instance of the application in a third subnet. In one embodiment, the third subnet is a subnet in the cloud data center that is not the first or second subnets. In other embodiments, the third subnet comprises a subnet in a private network infrastructure, such as a corporate data center. In still further embodiments, the third subnet may comprise a subnet in another cloud data center.

In alternate embodiments, the new stand-by instance of the application is pre-launched and is designated as the new stand-by instance for the new primary operating instance of the application. At the completion of step 1013, the process of managing the application to avoid low bandwidth is completed. Alternatively, in one embodiment, the method 1000 starting from step 1003 may be repeated periodically (e.g., according to a pre-determined length of time), so as to perform a plurality of migrations or "application hopping" to pro-actively avoid further requisitioned DoS attacks and similar compromised bandwidths.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. In particular, while embodiments of the claimed subject matter have been described with reference to a cloud infrastructure for the sake of clarity, it is to be understood that the subject matter is not limited to implementations which include such an infrastructure. Instead, the claimed subject matter is well suited to alternate configurations of distributed networking systems, which may include, but are not limited to cloud infrastructures and private enterprise network infrastructures.

What is claimed is:

1. A method for managing operation of an application to avoid degradation of quality of service, comprising:
    monitoring execution of a first instance of the application executing in a first computing environment for a degraded quality of service, the first instance of the application comprising a primary operating instance of the application;
    receiving a high traffic of messages from the first instance of the application;
    receiving a first plurality of UDP packets among the high traffic of messages indicating a degraded quality of service corresponding to the first instance of the application, the degraded quality of service comprising a deterioration of bandwidth available to the first instance of the application;
    determining a bandwidth available to a second instance of the application executing in a second computing environment located in a different subnet of a computer network from the first computing environment;
    sending a second plurality of UDP packets to the first instance of the application, the second plurality of UDP packets comprising an instruction to perform one or more actions that facilitate transfer of a primary operation of the application; and
    migrating the primary operation of the application from the first instance of the application to the second instance of the application when the bandwidth available to the second instance exceeds the bandwidth available to the first instance of the application.

2. The method of claim 1, further including dynamically provisioning the second instance of the application following detecting the degraded quality of service corresponding to the first instance of the application.

3. The method of claim 1, wherein detecting the degraded quality of service comprises detecting bandwidth starvation in a networking device providing network routing service to a first subnet of the computer network, the first subnet comprising a plurality of computing environments, including the first computing environment.

4. The method of claim 3, wherein detecting bandwidth starvation comprises sending a plurality of probes to a destination and determining a delay in a received response to the plurality of probes.

5. The method of claim 4, wherein the destination is outside of the first subnet, wherein a probe of the plurality of probes comprises a packet pair, wherein the packet pair comprises a first packet and a second packet, and detecting bandwidth starvation comprises:
    sending the packet pair to the destination; and
    measuring a time delay between receiving a response from the destination corresponding to the first packet of the packet pair and a response from the destination corresponding to the second packet of the packet pair.

6. The method of claim 4, wherein sending a plurality of probes comprises sending a plurality of single probe packets to the destination, and detecting bandwidth starvation comprises:
    queueing the plurality of single probe packets to be sent to the destination; and
    measuring a queueing delay corresponding to the plurality of single probe packets in the networking device.

7. The method of claim 1, wherein migrating primary operation of the application comprises:
    re-assigning a second IP address corresponding to the second instance of the application with a first IP address corresponding to the first instance of the application.

8. The method of claim 1, wherein migrating primary operation of the application comprises:
    re-programming a DNS resolution of a domain name corresponding to the first instance of the application to correspond to the second instance of the application.

9. The method of claim 1, further including:
    provisioning a third instance of the application when the bandwidth available to the second instance of the application does not exceed the bandwidth available to the first instance of the application, the third instance of the application being provisioned on a third computing environment located in a different subnet of the computer network from both the first computing environment and the second computing environment;
    migrating primary operation of the application from the first instance of the application to the third instance of the application when the bandwidth available to the third instance exceeds the bandwidth available to the first instance of the application.

10. The method of claim 1, further including:
    provisioning, following migrating primary operation of the application from the first instance of the application to the second instance of the application, a third instance of the application being provisioned on a third computing environment located in a different subnet of the computer network from both the first computing environment and the second computing environment.

11. The method of claim 1, wherein the first plurality of UDP packets compete with the high traffic of messages such that the first plurality of UDP packets are received at a monitoring agent.

12. A method for managing operation of an application to avoid low bandwidth, comprising:
    monitoring execution of a first instance of the application for low bandwidth, the first instance of the application serving as a primary operating instance of the application and executing in a first computing environment located in a first subnet of a computer network;
    receiving a high traffic of messages from the first instance of the application;
    receiving a first plurality of UDP packets among the high traffic of messages indicating a low bandwidth condition corresponding to the first instance of the application, the low bandwidth condition indicating that a bandwidth available to the first instance of the application is below a first threshold bandwidth;
    determining a bandwidth available to a pre-launched, second instance of the application operating as a stand-by instance of the application, the second instance of the application executing in a second computing environment hosted in a second subnet of the computer network different from the first subnet;
    sending a second plurality of UDP packets to the first instance of the application, the second plurality of UDP packets comprising an instruction to perform one or more actions that facilitate transfer of a primary operation of the application; and
    migrating the primary operation of the application from the first instance to the second instance of the application when the bandwidth available to the second instance of the application exceeds a second threshold bandwidth.

13. The method of claim 12, wherein the first plurality of UDP packets compete with the high traffic of messages such that the first plurality of UDP packets are received at a monitoring agent.

14. The method of claim 12, wherein the second threshold bandwidth is set to be greater than the current bandwidth of the primary operating instance of the application.

15. The method of claim 12, wherein migrating primary operation of the application from the first instance to the second instance of the application comprises:
    deactivating the first instance of the application as the primary operating instance of the application;
    activating the second instance of the application as the primary operating instance of the application; and
    launching a third instance of the application on a third computing environment hosted in a third subnet of the computer network that is different from the first and second subnets, the third computing environment comprising a new stand-by instance of the application.

16. The method of claim 15, wherein deactivating the first instance of the application as a primary operating instance of the application comprises:
    providing notification to the first instance of the application to terminate operation and perform any operations required to facilitate migration of primary operation of the application to the second instance of the application.

17. The method of claim 12, wherein migrating primary operation of the application from the first instance to the second instance of the application comprises:
    deactivating the first instance of the application as the primary operating instance of the application;
    activating the second instance of the application as the primary operating instance of the application; and
    designating a pre-launched third instance of the application as a new stand-by instance for the application, the pre-launched third instance of the application executing on a third computing environment in a third subnet of the computer network that is different from the first and second subnets.

18. The method of claim 12, further including, when the bandwidth available to the second instance of the application does not exceed the second threshold bandwidth:
    launching a plurality of additional instances of the application;
    estimating bandwidths available to each of the plurality of additional instances of the application;
    evaluating the bandwidths relative to the second threshold bandwidth;
    selecting a new stand-by instance from the plurality of additional instances; and
    migrating the primary operation of the application from the first instance to the selected new stand-by instance if a bandwidth corresponding to the selected new stand-by instance has a bandwidth greater than the second pre-determined threshold.

19. The method of claim 18, wherein each of the plurality of additional instances of the application are launched on different computing environments each hosted in a different subnet of the computer network from the first and second subnets.

20. The method of claim 12, wherein migrating primary operation from the first instance of the application to the second instance of the application comprises:
    changing a static IP address of the second computing environment to the static IP address of the first computing environment.

21. The method of claim 12, wherein migrating the primary operation from the first instance of the application to the second instance of the application comprises:
    changing a DNS translation of a domain name corresponding to the application from translating to an IP address of the first computing environment to an IP address of the second computing environment.

22. An application management system, the system comprising:
    a computer network comprising a plurality of computing environments distributed among a plurality of subnets of the computer network,
    a first computing environment of the plurality of computing environments being communicatively coupled to a first subnet of the plurality of subnets by a first networking device, the first computing environment executing a first instance of an application comprising a primary operating instance of the application,
    a second computing environment of the plurality of computing environments being communicatively coupled to a second subnet of the plurality of subnets by a second networking device, the second computing environment executing a second instance of the application comprising a stand-by instance of the application; and
    a monitoring agent for managing operation of the application, the monitoring agent being configured to:

receive a high traffic of messages from the first instance of the application, receive a first plurality of UDP packets among the high traffic of messages indicating that a degraded quality of service is being experienced by the first instance of the application, send a second plurality of UDP packets to the first instance of the application, the second plurality of UDP packets comprising an instruction to perform one or more actions that facilitate transfer of a primary operation of the application, and initiate a migration of the primary operation of the application from the first instance of the application to the second instance of the application when a bandwidth available to the second instance of the application exceeds a bandwidth available to the first instance of the application.

23. The system of claim 22, wherein at least one of the first computing environment and the second computing environment comprises a virtual machine.

24. The system of claim 22, wherein the monitoring agent is executed on another one of the plurality of computing environments that is not communicatively coupled to the first subnet.

25. The system of claim 22, wherein the monitoring agent is configured to detect that a degraded quality of service is being experienced by the first instance of the application by detecting bandwidth over-consumption by at least one of a plurality of constituent computing environments communicatively coupled to the first subnet.

26. The system of claim 22, wherein monitoring agent is configured to detect that a degraded quality of service is being experienced by the first instance of the application by detecting a denial of service attack affecting at least one of a plurality of constituent computing environments communicatively coupled to the first subnet.

27. The application management system of claim 22, wherein the first plurality of UDP packets compete with the high traffic of messages such that the first plurality of UDP packets are received at the monitoring agent.

* * * * *